(12) United States Patent
Leung et al.

(10) Patent No.: US 8,503,318 B2
(45) Date of Patent: *Aug. 6, 2013

(54) ESTIMATING ENDPOINT PERFORMANCE IN UNIFIED COMMUNICATION SYSTEMS

(75) Inventors: Yiu-Ming Leung, Kirkland, WA (US); Jisun Park, Bellevue, WA (US); Vincent Allio, Beijing (CN)

(73) Assignee: Microsoft Corporation, Redmond, WA (US)

( * ) Notice: Subject to any disclaimer, the term of this patent is extended or adjusted under 35 U.S.C. 154(b) by 307 days.

This patent is subject to a terminal disclaimer.

(21) Appl. No.: 12/894,830

(22) Filed: Sep. 30, 2010

(65) Prior Publication Data

US 2011/0019570 A1   Jan. 27, 2011

Related U.S. Application Data

(63) Continuation-in-part of application No. 12/028,896, filed on Feb. 11, 2008, now Pat. No. 7,852,784.

(51) Int. Cl.
*H04J 1/16* (2006.01)
(52) U.S. Cl.
USPC .......................................................... 370/252
(58) Field of Classification Search
None
See application file for complete search history.

(56) References Cited

U.S. PATENT DOCUMENTS

| | | | |
|---|---|---|---|
| 6,408,335 B1 | 6/2002 | Schwaller | |
| 6,621,515 B2 | 9/2003 | Matthews | |
| 6,665,271 B1 | 12/2003 | Thomas | |
| 7,225,459 B2 | 5/2007 | Magliaro | |
| 7,852,784 B2 * | 12/2010 | Leung et al. | 370/252 |
| 2003/0231618 A1 | 12/2003 | Punjabi | |
| 2004/0170164 A1 | 9/2004 | LeBlanc et al. | |
| 2006/0146784 A1 | 7/2006 | Karpov et al. | |
| 2006/0239184 A1 | 10/2006 | Moore | |
| 2006/0239185 A1 * | 10/2006 | Moore | 370/229 |
| 2007/0133403 A1 | 6/2007 | Hepworth et al. | |
| 2007/0133515 A1 | 6/2007 | Kumar | |
| 2007/0168591 A1 | 7/2007 | Chua | |
| 2007/0248022 A1 | 10/2007 | Kumar | |
| 2007/0286351 A1 | 12/2007 | Ethier et al. | |
| 2009/0201824 A1 | 8/2009 | Leung et al. | |

FOREIGN PATENT DOCUMENTS

WO   WO 0230042 A2   4/2002

OTHER PUBLICATIONS

Telecollaboration—"A Case Study for Performance Analysis of VOIP Systems", Venkatesh Mahadevan et al., http://teleholonics.eng.uts.edu.au/pubs_archive/06%20IADIS%20.pdf, 2003, pp. 1-6.
Experiences with Evaluating Network QoS for IP Telephony, M. Bearden et al., http://citeseer.ist.psu.edu/cache/papers/cs/26710/http:zSzzSzwww.research.avayalabs.comzSztechreportzSzALR-2002-006-paper.pdf/bearden02experiences.pdf, 2002, pp. 1-15.
Assessing VoIP Call Quality Using the E-model, 1998-2004 Ixia, http://www.ixiacom.com/library/white_papers/display?skey=voip_quality&print=1, pp. 1-7.
Official Action mailed Jan. 21, 2010 cited in U.S. Appl. No. 12/028,896, pp. 1-16.

\* cited by examiner

*Primary Examiner* — Minh-Trang Nguyen
(74) *Attorney, Agent, or Firm* — Merchant & Gould (57) ABSTRACT

Performance of endpoints, client devices and servers within a communication system, is determined by collecting call quality data from each endpoint by a quality monitoring server/application. Call quality data includes predefined metrics based on network and end device characteristics during each call. Calls include voice, video, and data exchanges. Collected metric values are then aggregated according to a formula for consistency and scaled based on factors such as traffic volume. Resulting performance values are used to order the endpoints such that those with degraded quality and prioritized based on factors like traffic volume can be attended to first.

19 Claims, 6 Drawing Sheets

ESTIMATING ENDPOINT PERFORMANCE IN UNIFIED COMMUNICATION SYSTEMS

CROSS-REFERENCE TO RELATED APPLICATIONS

This application is a continuation-in-part of U.S. application Ser. No. 12/028,896, filed on Feb. 11, 2008, which is incorporated herein by reference in its entirety.

BACKGROUND

Voiced telecommunication systems have evolved from telephones that were originally connected directly together in pairs to trunked exchange systems and from there to completely digital systems where communication is facilitated through exchange of data packets over a number of interconnected networks. For example, Voice Over IP (VOIP) telephony uses internet protocol over wired and wireless networks, which may be public, secure, or a combination of the two.

Additional communication modes such as video, instant messaging, application or data sharing have also proliferated in recent years with the availability of diverse types of communication networks and devices capable of taking advantage of various features of these networks. Some more recent systems (e.g. unified communication systems) take advantage of capabilities of modern networks and computing devices bringing together different communication networks and providing until now unavailable functionality such as combining various modes of communication, user defined routing mechanisms, and so on. In such systems, a network of servers manages end devices capable of handling a wide range of functionality and communication while facilitating communications between the more modern unified communication network devices and other networks (e.g. PSTN, cellular, etc.).

In a system that supports multiple forms of communication, it is important for administrators to be aware of the quality of experience delivered to the users by the system. This enables the administrators to adjust the configuration of the system as needed when the quality deteriorates. Quality of experience may degrade generally due to problems in the network(s) or problems in the computing devices through which the media travels. If the problem happens to be on the machines, it is difficult for the administrators to narrow down and focus on the problematic ones in a system with a large number of devices. Determination of the source of the problem requires a systematic approach to find the worst performing device(s).

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to determining a performance of endpoints in a communication system quantitatively and systematically, taking into account aspects of the system such as volume of traffic to enhance a capability of administrators to address quality issues promptly and efficiently for the overall communication system.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, a performance of endpoints in a communication system may be determined quantitatively and systematically, to enhance a capability of administrators to address quality issues promptly and efficiently for the overall communication system. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

While the term "call" is mainly used in examples throughout this document as referring to voice communications, it is not so limited. "Call" may also be used in reference to video communications, conference communications, instant messaging, and other forms of communication discussed herein in conjunction with estimating endpoint performance.

Figure 1:
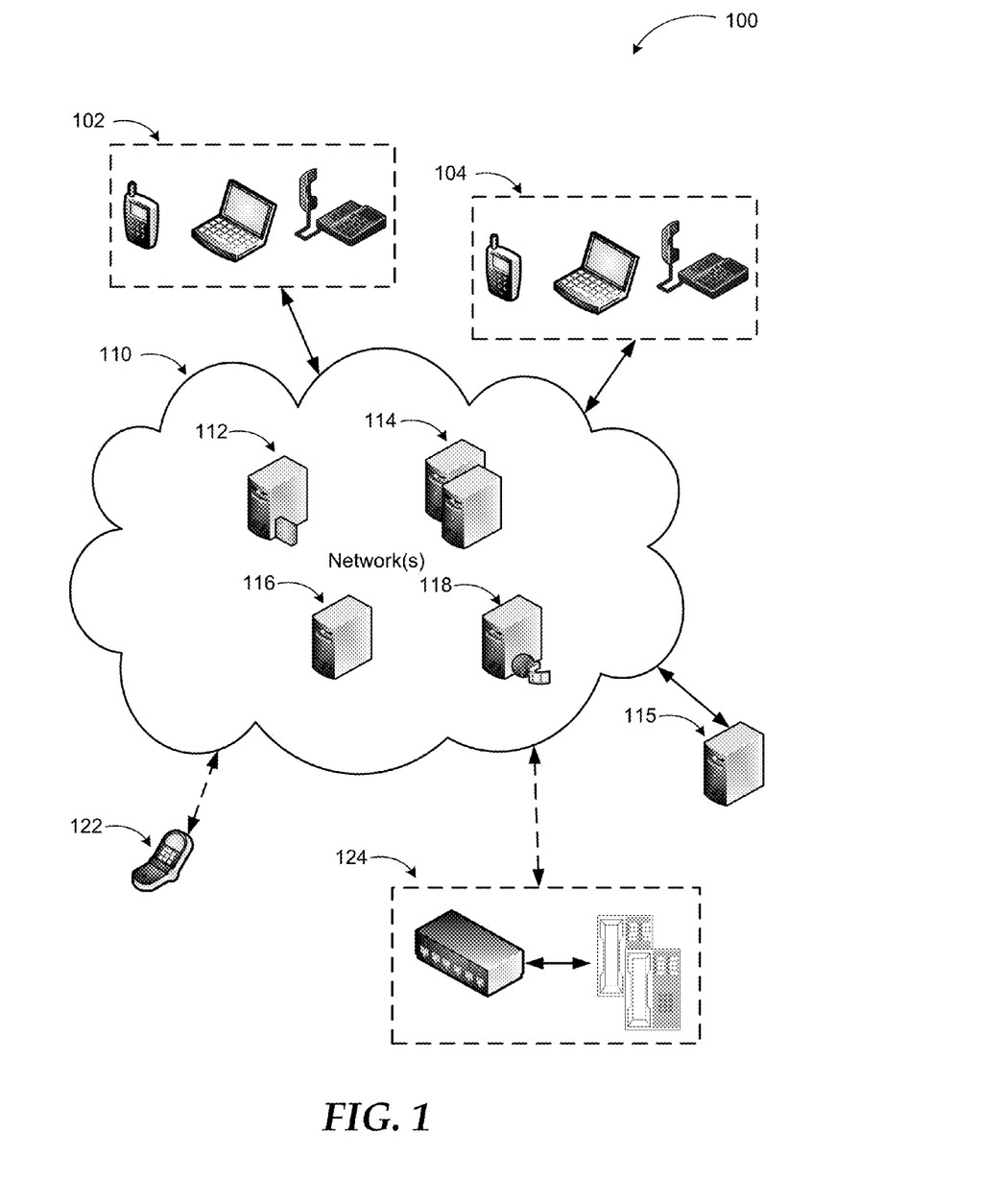
FIG. 1 is a diagram illustrating an example unified communications system.

Referring to FIG. 1, diagram 100 of an example unified communications system is illustrated. As discussed above, a system that supports multiple forms of communication with a complex interconnection of different networks and a large number of computing devices (servers, endpoints, specialized devices, etc.) may experience degradation of quality in the experience delivered to the users due to problems in the network(s) or problems in the computing devices. Without a systematic and well defined approach, it may be difficult, if not impossible, to determine problematic devices in a system with a large number of, computing devices. The situation may become more complicated by the fact that not all devices carry the same amount of traffic. For those machines that carry more traffic, more weight may need to be assigned, since they "contribute" more to the overall system performance.

Embodiments are directed to determining a performance of each endpoint in a communication system quantitatively and systematically, taking into account aspects of the system such as volume of traffic to enhance a capability of administrators to address quality issues promptly and efficiently for the overall communication system.

In a unified communication system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network (PSTN). End devices may include any type of smart phone, cellular phone, any computing device executing a communication application, a smart automobile console, and advanced phone devices with additional functionality.

Unified Communication (UC) Network(s) 110 includes a number of servers performing different tasks. For example, UC servers 114 may provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent (e.g. Business-To-Business User Agent "B2BUA").

Quality Monitoring Server (QMS) 115 is tasked with collecting communication data such as statistical data associated with quantitative and qualitative aspects of communications from endpoints within the system. Endpoint is a general term referring to each end device as well as any server that is directly involved with communications within UCN 110. For example, mediation server 116 and A/V conferencing server 118 are directly involved with the communication as nodes within the network. Therefore, performance of these servers may affect quality of communications (e.g. degradation due to delays in the servers), and thus they are considered endpoints.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method. End devices and servers may communicate with each other via SIP (e.g. collection of communication quality information by the QMS from each endpoint).

The SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients use Transport Control Protocol ("TCP") or User Datagram Protocol ("UDP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

SIP is intended to provide a signaling and call setup protocol for IP-based communications that can support a superset of the call processing functions and features present in the PSTN. SIP by itself does not define these features, however. Rather, its focus is call-setup and signaling. SIP is also designed to enable the building of such features in network elements known as proxy servers and user agents. These are features that permit familiar telephone-like operations: dialing a number, causing a phone to ring, hearing ring back tones or a busy signal.

While the example system is described with specific servers and SIP features in this and following figures, many other components (e.g. servers, firewalls, data stores, etc.) and protocols may be employed in implementing embodiments using the principles described herein. Functionality of the systems enabling estimation of endpoint performance may also be distributed among the components of the systems differently depending on component capabilities and system configurations.

Figure 2:
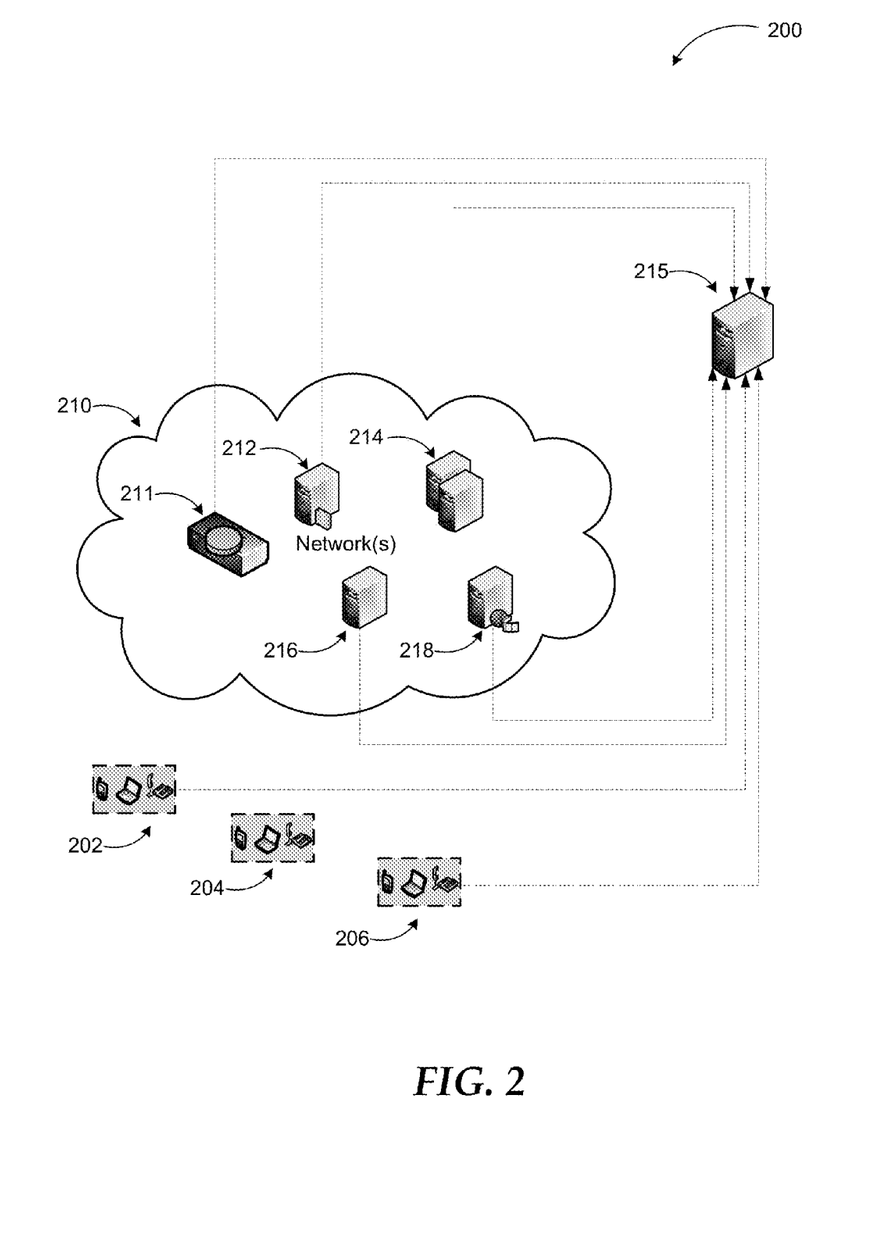
FIG. 2 illustrates a simplified unified communications system with communication quality information being collected by a quality monitoring server from endpoints within the system.

FIG. 2 illustrates a simplified unified communications system with communication quality information being collected by a quality monitoring server from endpoints within the system.

A number of metrics may be used in a communication system to determine performance quantitatively and qualitatively. A majority of these metrics may be measured by the endpoints (e.g. end devices, servers, etc.) during each call and then transmitted to QMS 215 for storage, aggregation, and analysis. The metrics may be uniform (i.e. measured and collected by all endpoints) or specific (e.g. metrics specific for video communication capable end devices, metrics for servers only, and the like). While a system according to embodiments may utilize any metrics to estimate endpoint performance, example ones are discussed herein.

Network 210 in diagram 200 includes in addition to access server 212, UC server(s) 214, A/V conferencing server 218, and mediation server 216, Multipoint Conferencing Unit (MCU) 211. MCU 211 is employed for facilitating conference calls, audio or video. Each of these servers as well as end devices 202, 204, and 206 are endpoints or machines that can affect communication quality. Thus, each machine is configured to collect call quality data and report the data to QMS 215 at the conclusion of each call. Alternatively, the collected data may be aggregated at the endpoints and provided to QMS 215 upon request or periodically.

The example metrics according to a preferred embodiment include:
(1) call failure,
(2) network delay,
(3) Network Mean Opinion Score "NMOS" (based on network jitter and packet loss, assuming perfect source and receiver conditions),
(4) Listen Mean Opinion Score "LMOS" (based on compression, mixing, and decoding degradation, assuming perfect source and network conditions),
(5) Send Mean Opinion Score "SMOS" (based on microphone quality, may be measured or based on a library of microphone characteristics),
(6) Conversation Mean Opinion Score "CMOS" (based on delay).

A system according to embodiments, not only collects these metrics, but aggregates them computes a worst endpoint list based on weighted aggregation of the scores, and provides the list to an administrator such that the administrator can focus on endpoints that need immediate attention. In a complex and big network, a large number of endpoints may provide quality information that is below a predefined threshold at one point in the operation. As mentioned previously, an endpoint with a small number of calls (e.g. an end device that is used for one call a day) may be de-prioritized compared to an endpoint that is handling, and thereby affecting, a large number of calls. Thus, weighted aggregation of collected metrics is an important aspect of a QMS monitoring communications quality over the network. To aggregate the collected metrics and determine an endpoint needing most urgent attention, a formula based approach is used according to one embodiment. For each endpoint a Bad Performance Index (BPE) is computed using equation (1) based on metrics collected from calls in a given time window. An increased BPE indicates worse performance by a particular endpoint moving it to a higher spot on the worst performing endpoints list and catching attention from the administrator.

Thus, for an endpoint (ep), the BPE may be expressed as:

$$BPE(ep) = SNSF*(\alpha*NPM + (1-\alpha)*PM, \text{ where } 0 \leq \alpha \leq 1.0. \quad [1]$$

SNSF is Sample Number Scaling Factor that allows the endpoints with more samples (calls) to get more attention by the administrator while an endpoint with BPE having a small number of calls is suppressed (placed lower in the worst performing endpoints list). Network Payload Metrics (NPM) represents a linear combination of network based metrics, while Payload Metrics (PM) represents a combination of end device based metrics. $\alpha$ is a combinatory factor and can be selected between 0 and 1 as indicated above. In an example implementation, $\alpha$ may be set to 0.5. $B_{count}$ is the sensitivity of BPE to the number of call samples.

The SNSF, which is introduced in equation [1] to incorporate the effect of the number of samples (calls), is defined following a statistical sigmoid curve and may be expressed as:

$$SNSF = \frac{1}{1 + e^{-B_{count}(num_{samples} - StatsGenerationMinSamples)}}, \quad [2]$$

if $num_{samples} < 2 * StatsGenerationMinSamples$, and $$SNSF = 1, \text{ otherwise.} \quad [3]$$

The setting of the SNSF to 1, as shown in equation [3], when the sample number is too high (2*StatsGenerationMinSamples parameter) is intended to prevent an arithmetic overflow in a database server due to large number of samples. $B_{count}$ is the sensitivity of BPE to the number of call samples. $num_{samples}$ is the number of samples, and StatsGenerationMinSamples is a predefined parameter indicating a minimum number of samples (calls) necessary for useful results.

As mentioned above, network based metrics or NPM in equation [1] may be determined as a linear combination of network based metrics: call failure, network delay, and NMOS. NPM may be expressed as:

$$NPM = \frac{num(\text{calls degraded network}) + num(\text{calls with high delay}) + num(\text{calls with failed connectivity})}{num(\text{total calls})} \quad [4]$$

Thus, NPM is the sum of network degraded calls, calls with high delay due to network, and failed calls, divided by the total number of calls. From equation [4], the NPM ranges between 0 and 3. The measure may also be normalized to a specific range (e.g. 0 to 1) or used as is.

A PM metric may be presented by a normal distribution with (mean "$\mu$", standard deviation "$\sigma$"). According to one embodiment, three PM metrics may be used to measure call quality based on end device performance: LMOS($\mu_L$, $\sigma_L$), SMOS($\mu_S$, $\sigma_S$), and CMOS($\mu_C$, $\sigma_C$), as discussed above. In order to incorporate both quality and consistency into the performance estimate, PM may be defined as:

$$PM = \frac{1}{1 + e^{-B_L(\sigma_L - \omega_L)}} \cdot \frac{MOS_{MAX} - avg(LMOS)}{MOS_{MAX} - MOS_{MIN}} + \quad [5]$$

$$\frac{1}{1 + e^{-B_S(\sigma_S - \omega_S)}} \cdot \frac{MOS_{MAX} - avg(SMOS)}{MOS_{MAX} - MOS_{MIN}} +$$

-continued $$\frac{1}{1+e^{-B_C(\sigma_C - \omega_C)}} \cdot \frac{MOS_{MAX} - avg(CMOS)}{MOS_{MAX} - MOS_{MIN}}.$$

In equation [5], $B_x$ is the growth rate of the sigmoid logistic function, and $\omega_x$, is where the highest growth rate exists. Basically, this logistic function maps the standard deviation, σ, which could range from [0, infinite] into [0, 1] and promote or demote the values of both ends. If standard deviation value is large, it means the values are not concentrated (not consistent) so the logistic function yields a high value, and it is multiplied to the distance between maximum MOS "$MOS_{MAX}$" and average MOS "avg(XMOS)". Therefore, if MOS is away from the maximum MOS and has a high standard deviation, then PM becomes larger. $B_x$ and $\omega_x$ may be adjusted through iterative experiments. For statistical significance, a minimum number of samples may be required when calculating PM. However, because of SNSF, endpoints with less than the minimum required samples may also be included. The SNSF demotes the BPE of those endpoints.

The above described metrics, formulas for computing the metrics, and parameters are for example purposes and do not constitute a limitation on embodiments. Endpoint performance in a unified communication system may be determined and computed using any defined metric and any computation formula using the principles described herein by ensuring higher traffic machines are more prominent and sample sizes are reasonable in the final analysis.

Figure 3:
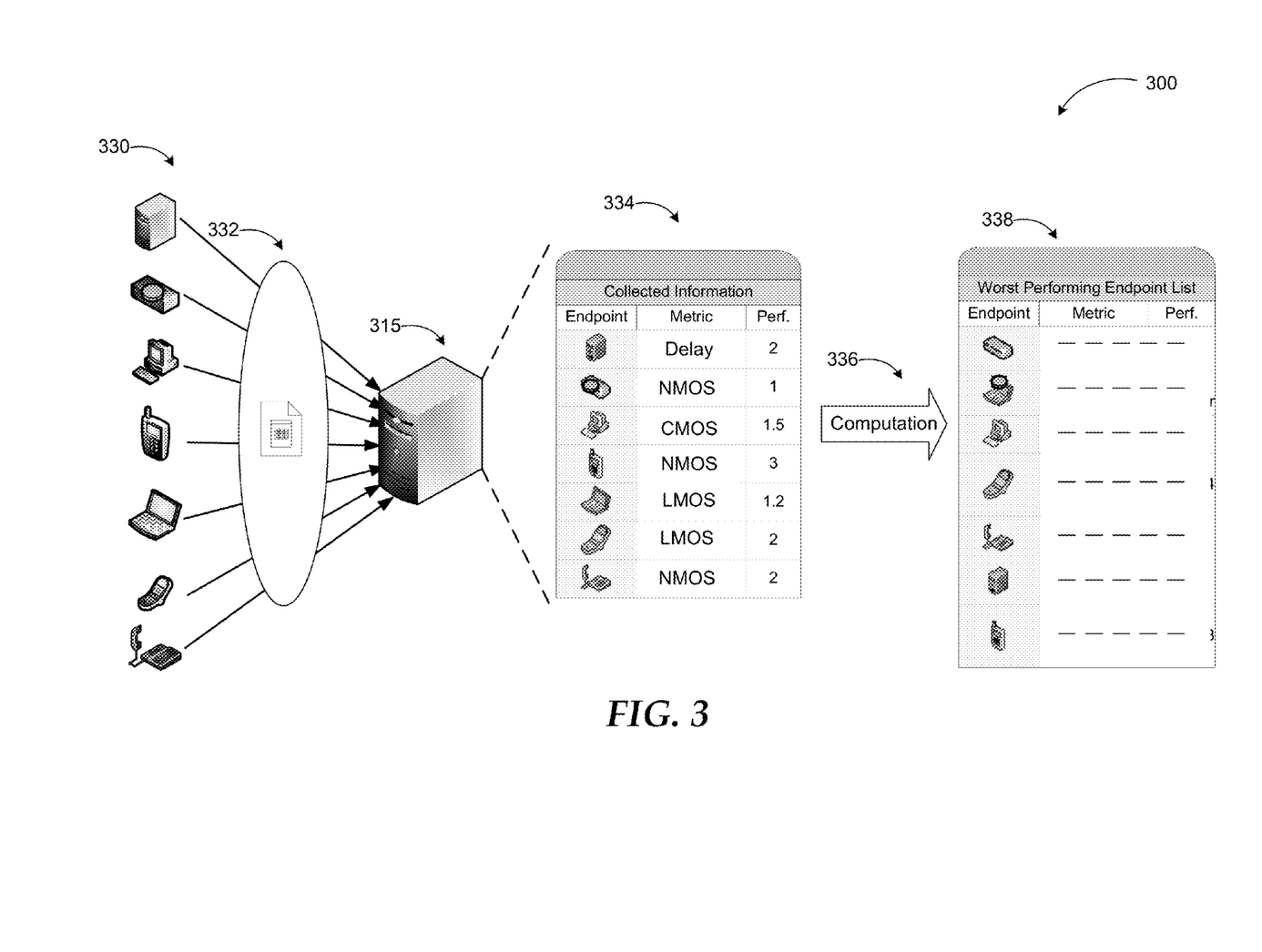
FIG. 3 is a conceptual diagram, illustrating collection of communication quality information, aggregation of collected results, and computation of a worst performing endpoint list based on collected data according to embodiments.

FIG. 3 is a conceptual diagram, illustrating collection of communication quality information, aggregation of collected results, and computation of a worst performing endpoint list based on collected data according to embodiments.

Endpoints 330, which may include servers, end devices, and other devices associated with a unified communication network, each provide collected data 332 on communication quality to QMS server 315. The information may be provided at the end of each call (voice or otherwise) or aggregated and provided upon request or periodically. The information may be provided directly to QMS 315 via a protocol such as SIP or through an intermediary device. For example, each endpoint may store their collected information in a network data store and QMS 315 may retrieve the data from the data store later for analysis. The information may be provided in any form such as simple SIP message, Extended Markup Language (XML) data, and the like. Furthermore, each endpoint may collect the same type of information (same metrics) or different metrics based on their capabilities, and so on.

QMS 315 may maintain a list 334 of the endpoints and the metrics provided by each endpoint. The list may be maintained in form of a table, a matrix, multi-dimensional data structure, and the like. The list 334 may identify each endpoint, collected metric types and values from each endpoint. Computation 336 is performed on the collected values of the quality metrics to determine performance of each endpoint and prioritize them according to which one performs worse and which one should be attended to first. These two attributes may be distinct, as discussed previously. Thus, computation 336 may take into account an importance of each endpoint based on a number of calls affected by that endpoint such as weighting the calculation (e.g. SNSF discussed above). Traffic volume is not the only prioritization parameter. According to other embodiments, other considerations such as endpoints belonging to a special subnet may also be prioritized over others. For example, in an enterprise communication network, it may be desirable to attend to problems within the administration subnet or customer service subnet first. Thus, metrics from endpoints belonging to those subnets may be given higher weight (larger SNSF) in the computation.

As a result of computation 336, QMS 315 may generate a worst performing endpoint list 338, which orders the endpoints according to their performance such as their BPE. Because the worst performing endpoint list 338 is based on a scaled computation of performance factors such as NPM and PM, the highest endpoints on the list may be attended to first assuming they are the most important ones to investigate. List 338 may also provide additional information such as details of each metric for each endpoint, aggregations of categories of metric such as NPM and PM, and even historic information such as when the endpoint was serviced last, etc. Part or all of the information included in list 338 may be stored in a data store for retrieval by another application, provided directly to a presentation, analysis, or scheduling application (for scheduling service). Alert(s) may be issued based on the performance values in the list 338. For example, if the BPE of an endpoint exceeds a predetermined threshold, an alert in form or a call, a voicemail, an email, an instant message, etc. may be transmitted to an administrator. List 338 may also be provided textually or graphically through any user interface to an administrator.

The operations and scenarios, as well as components of a unified communication system determining performance of endpoints, described in FIGS. 2 and 3 are exemplary for illustration purposes. A unified communication system according to embodiments may be implemented using additional or fewer components and other schemes using the principles described herein.

Figure 4:
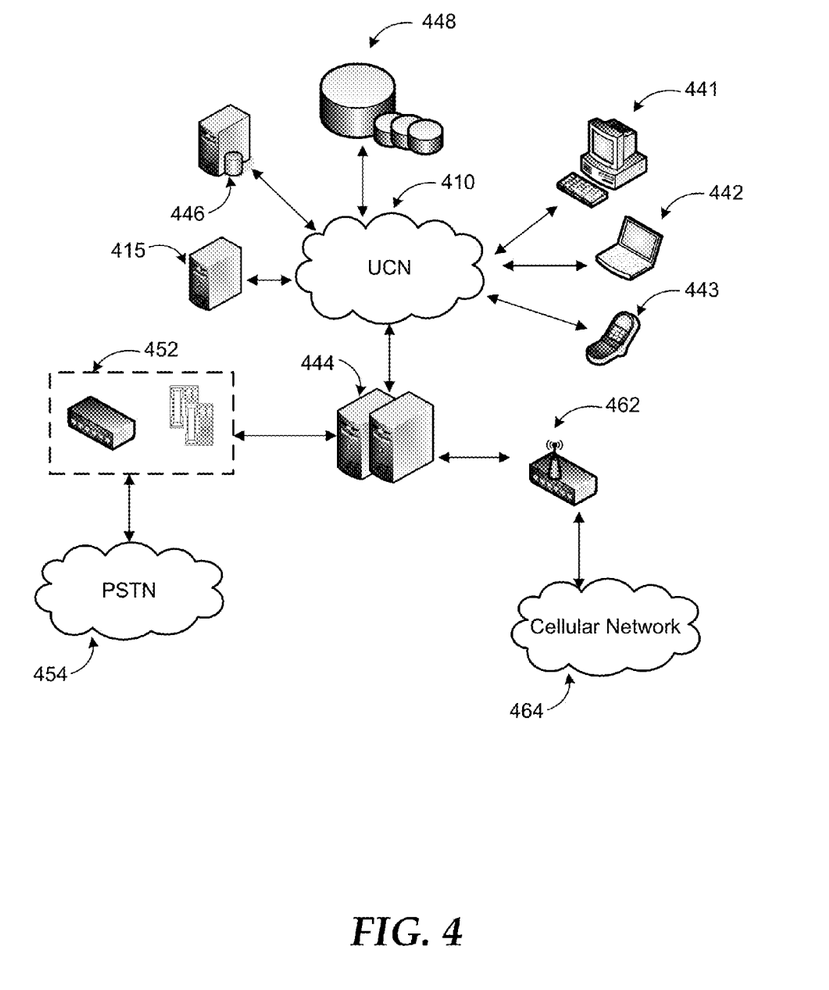
FIG. 4 illustrates a networked environment where embodiments may be implemented.

FIG. 4 is an example networked environment, where embodiments may be implemented. Estimating endpoint performance as described previously may be implemented locally or in a distributed manner over a number of physical and virtual clients and servers. Such a system may typically involve one or more networks such as PSTN 454, cellular network 4644, and UCN 410. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. A system according to embodiments may involve many more components, typical and relevant ones are discussed in conjunction with this figure.

Mediation server(s) 444 may provide signaling and media exchange between the different systems. A PBX 452 and an RF modem 462 may be used for connection between the PSTN and the cellular networks, respectively, and the mediation server(s) 444. Client devices 441-443 communicate with each other and with devices on other networks through UCN 410. The UC system may also include a UC server (not shown) for registering, routing, and other functionality.

QMS server 415 may monitor communication quality within the system by collecting quantitative and qualitative call information from endpoints, aggregating the information by scaling it according to traffic volume and/or other factors, and determining endpoint performance based on a formula combining different scaled metrics. Data associated with the system configuration (e.g. user names, phone numbers, call policies, configuration, records, etc.), metrics, metric values, and so on, may be stored in one or more data stores such as data stores 448, which may be directly accessed by the servers and/or clients of the system or managed through a database server 446. UCN 410 provides the backbone of the UC system and may employ a number of protocols such as SIP, RTP, and the like. Client devices (e.g. 441-443) provide platforms for UCN user endpoints. Users may access the communication system using a client device or one or more client applications running on a client device.

UCN 410 provides communication between the nodes described herein. By way of example, and not limitation, UCN 410 may include wired media such as a wired network or direct-wired connection, and wireless media such as acoustic, RF, infrared and other wireless media.

Many other configurations of computing devices, applications, data sources, data distribution systems may be employed to implement estimation of endpoint performance. Furthermore, the networked environments discussed in FIG. 4 are for illustration purposes only. Embodiments are not limited to the example applications, modules, or processes.

Figure 5:
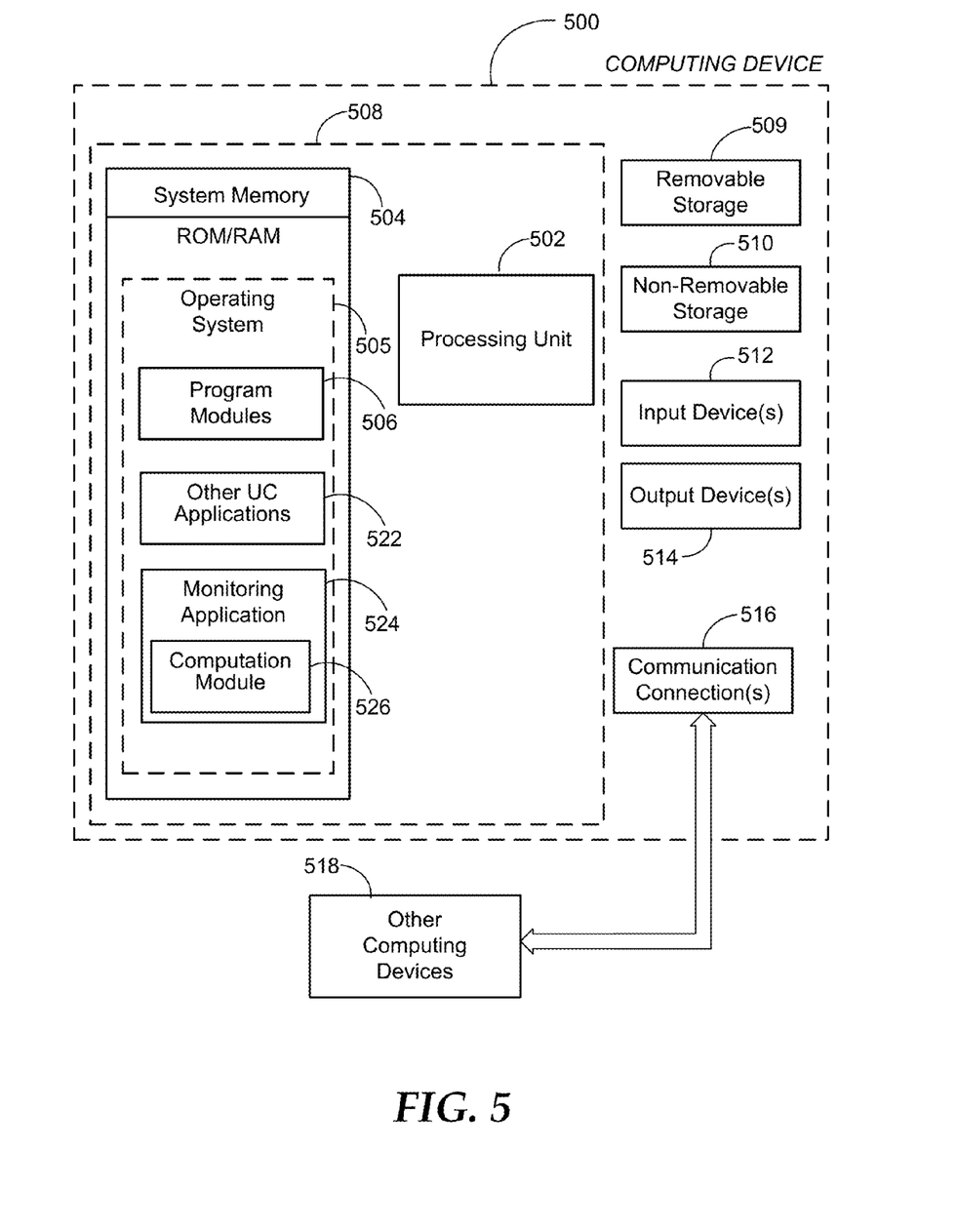
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a server executing a communication quality monitoring application for addressing communication quality problems in a unified communication system. Computing device 500 may typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the computing device, such as the WINDOWS® operating systems from MICROSOFT CORPORATION of Redmond, Wash. The system memory 504 may also include one or more software applications such as program modules 506, other UC applications 522, and monitoring application 524 with its computation module 526.

Other UC applications 522 may be separate applications or integral modules of a hosted service application that provide advanced communication services through computing device 500 such signal routing, registration, and communication facilitation services with the end devices of the UC system, as described previously. Monitoring application 524 collect data associated with endpoint performance from the endpoints such as the metrics described previously. The collected data is then used for computing a performance value for each endpoint based on the metric values as well as weight factors such as traffic volume through the endpoint. An example of such a computation is provided by the bad performance index BPE in conjunction with FIG. 2. The computation may be performed by monitoring application 524, the computation module 526 within the application, or by a separate module. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable media, as used herein, may include computer storage media. Computer storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include client devices and servers of the UC network defined as endpoints above. The term computer readable media as used herein may also include communication media. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
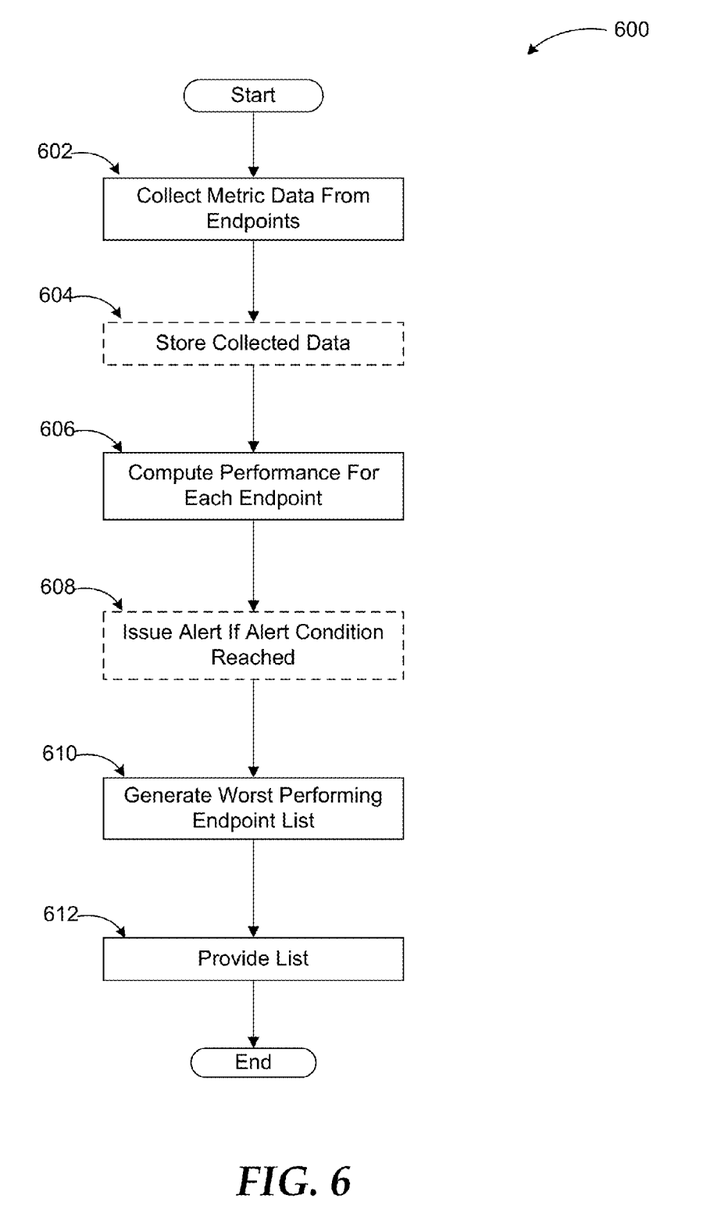
FIG. 6 illustrates a logic flow diagram for a process of estimating endpoint performance based on collection of communication quality information from the endpoints according to embodiments.

FIG. 6 illustrates a logic flow diagram for process 600 of estimating endpoint performance based on collection of communication quality information from the endpoints according to embodiments. Process 600 may be implemented in a quality monitoring server of a unified communication system.

Process 600 begins with operation 602, where metric data associated with communication quality is collected from each endpoint. As mentioned previously, the data may be about any form of communication and may be collected at the end of each call, periodically, or upon request by the quality monitoring server. Processing advances from operation 602 to optional operation 604.

At optional operation 604, the collected data is stored for subsequent retrieval, analysis, and the like. Processing continues to operation 606 from optional operation 604, where a performance of each endpoint is computed based on the collected data and one or more weighting factors such as SNSF based on number of calls handled by the endpoint. The performance may be computed using any linear or non-linear combination of the metrics conditioned for consistency or other aspects. Processing moves from operation 606 to optional operation 608.

At optional operation 608, an alert is issued if an alert condition based on the computed performance is reached. For example, a specific BPE threshold may be defined for different types of endpoints. If the threshold is reached, an alert may be transmitted to the administrator. Processing advances from optional operation 608 to operation 610.

At operation 610, a worst performing endpoint list is generated based on the computed performances. The list simply orders the endpoints based on their scaled and computed performances such that the endpoints needing most attention are listed at the top to draw the administrator's attention. Processing moves from operation 610 to operation 612, where the list is provided to an administrator, another application, and so on for display or further processing (e.g. analysis, storage). After operation 612, processing moves to a calling process for further actions.

The operations included in process 600 are for illustration purposes. Estimation of endpoint performance in unified communication systems may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for estimating endpoint performance in a unified communication network (UCN), comprising:
    collecting data associated with call quality metrics, the call quality metrics comprising at least one of uniform metrics, which are measured and collected by all of a plurality of endpoints, and metrics for specific types of endpoints within the plurality of endpoints;
    aggregating the collected data employing weighting based on call quality associated with each endpoint providing the data;
    generating a list of endpoints based on the aggregated data, wherein the endpoints are ordered in the list according to their performance weighted based at least one of the following: on the call quality associated with each endpoint and whether the endpoints belong to a subnet;
    computing, for each endpoint, a Bad Performance Index (BPE) based on metrics collected from calls in a given time window, an increased BPE indicating worse performance by a particular endpoint, the particular endpoint being moved to a higher spot on the list of endpoints; and
    providing the generated list to an administrator.

2. The method of claim 1, wherein the call quality metrics comprise:
    network based metrics including at least one from a set of: call failure, network delay, and Network Mean Opinion Score (NMOS) that is based on network jitter and packet loss; and
    end device based metrics including at least one from a set of: Listen Mean Opinion Score (LMOS) that is based on compression, mixing, and decoding degradation; Send Mean Opinion Score (SMOS) that is based on source microphone quality; and Conversation Mean Opinion Score (CMOS) that is based on conversation delay.

3. The method of claim 2, wherein weighted performance of each endpoint is determined by computing a performance index based on at least one of a non-linear combination of the network based metrics and a scaled linear combination of a network based metrics value and an end device based metrics value, and wherein a scaling factor is determined based on a number of calls handled by each endpoint.

4. The method of claim 3, wherein the network based metrics value is a combination of a number of network degraded calls, a number of network delayed calls, and a number of failed calls divided by a number of total calls.

5. The method of claim 3, wherein the end device based metrics value is combined normal distributions of LMOS, SMOS, and CMOS.

6. The method of claim 1, wherein the data is collected through one of: transmission by each endpoint at conclusion of each call, periodic transmission of aggregated data for a plurality of calls by each endpoint, and transmission of aggregated data for a plurality of calls by each endpoint upon request.

7. The method of claim 1, wherein the endpoints include one of: an end device for facilitating communication through the UCN, an access server, a mediation server, an audio/video conferencing server, and a multipoint conferencing unit.

8. The method of claim 1, wherein providing the list to the administrator includes at least one from a set of: displaying the list as at least one of text and graphics on a user interface, storing the list for subsequent retrieval, and providing the list to one of an analysis application, a scheduling application, and a presentation application.

9. The method of claim 1, wherein a call includes one of: a voice call, a video call, an audio conference, a video conference, an instant message session, an electronic mail exchange, an application sharing session, and a data sharing session.

10. The method of claim 1, wherein the call quality metrics are customizable for each endpoint such that each endpoint collects one of: a same type of information or a type of the call quality metrics and a different type of the call quality metrics, based on a capability of each endpoint.

11. The method of claim 1, further comprising issuing an alert in response the aggregated data exceeding a predetermined threshold for endpoint performance.

12. A system for estimating endpoint performance in a unified communication network (UCN), the system comprising:
    a plurality of endpoints comprising end devices, intermediary devices, and servers associated with the UCN for facilitating communications through the network, each endpoint configured to collect call quality metrics data, the system comprising the plurality of endpoints having at least one of a static and a dynamic topology;
    a quality monitoring server (QMS) associated with the UCN, the QMS configured to:
        maintain a list of endpoints associated with the UCN and with any external networks associated with the UCN;
        receive collected call quality metrics data from each endpoint;
        compute a scaled bad performance index (BPE) for each endpoint based on the collected call quality metrics data and scaled based on at least one of a number of calls handled by a respective endpoint and a location of the respective endpoint within the UCN;

generate a worst performing endpoint list based on ordering the plurality of endpoints according to their scaled BPEs; and issue an alert to an administrator if the scaled BPE of an endpoint exceeds a predefined threshold, wherein a specific BPE threshold is defined for different types of the plurality of endpoints, wherein the scaled BPE for each endpoint (ep) is computed by:

BPE(ep)=SNSF*(α*NPM+(1−α)*PM, where 0≤α≤1.0,

α being a predefined combinatory factor, NPM being a combination of network based metrics, PM being a combination of end device based metrics, and scaling factor SNSF being determined by:

$$SNSF = \frac{1}{1 + e^{-B_{count}(num_{samples} - StatsGenerationMinSamples)}},$$

$B_{count}$ being a sensitivity of BPE to a number of calls, $num_{samples}$ being a number of calls, and StatsGenerationMinSamples being a number of minimum calls required for statistically significant computation of BPE.

13. The system of claim 12, wherein SNSF is set to 1, if a number of calls is greater than a predetermined threshold based on StatsGenerationMinSamples such that an overflow of a data store is avoided due to large amount of call quality data.

14. The system of claim 12, wherein:
NPM is a sum of a number of network degraded calls, a number of network delayed calls, and a number of failed calls divided by a number of total calls; and
PM defined by:

$$PM = \frac{1}{1 + e^{-B_L(\sigma_L - \omega_L)}} \cdot \frac{MOS_{MAX} - avg(LMOS)}{MOS_{MAX} - MOS_{MIN}} +$$
$$\frac{1}{1 + e^{-B_S(\sigma_S - \omega_S)}} \cdot \frac{MOS_{MAX} - avg(SMOS)}{MOS_{MAX} - MOS_{MIN}} +$$
$$\frac{1}{1 + e^{-B_C(\sigma_C - \omega_C)}} \cdot \frac{MOS_{MAX} - avg(CMOS)}{MOS_{MAX} - MOS_{MIN}},$$

where $B_L$, $B_S$, $B_C$ are growth rate of a sigmoid logistic function, $\omega_L$, $\omega_S$, $\omega_C$ are where highest growth rate exists, $\sigma_L$, $\sigma_S$, $\sigma_C$, are standard deviations of respective mean opinion scores LMOS, SMOS, and CMOS, and $MOS_{MAX}$ and $MOS_{MIN}$ are maximum and minimum values for the mean opinion scores.

15. The system of claim 12, wherein the QMS is further configured to maintain the list of endpoints and the worst performing endpoint list as one of: a table, a matrix, and a multi-dimensional data structure, and wherein the list of endpoints and the worst performing endpoint list include at least one from a set of: an endpoint identifier, a type of collected metric data, a value of collected metric data, a time of collection, and historic information associated with performance of each endpoint.

16. The system of claim 12, wherein the call quality metrics data is transmitted by the endpoints at one of: end of each call, periodically, and receipt of a request from the QMS as one of a SIP message and an Extended Markup Language document.

17. One or more computer readable media, wherein the one or more computer readable media do not consist of a propagated data signal, the one or more computer readable media having stored thereon computer executable instructions that, when executed by a processor, will cause a computer to perform a method for estimating endpoint performance in a unified communication network (UCN), the method comprising:

collecting data associated with call quality metrics from endpoints comprising end devices, intermediary devices, and servers associated with the UCN for facilitating communications through the network at conclusion of each call, wherein a call includes at least one from a set of: a voice call, a video call, an audio conference, a video conference, an instant message session, an electronic mail exchange, an application sharing session, and a data sharing session;

computing a BPE for each endpoint, based on metrics collected from calls in a given time window, the BPE being based on a scaled combination of network based metric value (NPM) and end device based metric value (PM), wherein NPM is a sum of a number of network degraded calls, a number of network delayed calls, and a number of failed calls divided by a number of total calls, and PM is a combination of normal distributions of LMOS that is based on compression, mixing, and decoding degradation, SMOS that is based on source microphone quality, and CMOS that is based on conversation delay, taking into account a mean and a standard deviation of each Mean Opinion Score (MOS);

ordering a list of endpoints based on the scaled BPE for each endpoint such that endpoints with degraded performance and higher importance compared to other endpoints are prioritized by being moved to a higher spot on the list of endpoints, wherein endpoints with higher performance are determined based on an attribute identifying which one of the endpoints should be attended to first, wherein the attribute is distinct from another attribute identifying the degraded performance;

submitting the list to an application for at least one from a set of: storage, analysis, presentation, and scheduling of maintenance tasks.

18. The one or more computer-readable storage media of claim 17, wherein a minimum number of calls are required for an endpoint prior to computing the scaled BPE for that endpoint.

19. The one or more computer-readable storage media of claim 17, wherein the instructions further comprise:
normalizing the NPM and the PM prior to combining and scaling them to obtain the BPE.

* * * * *